United States Patent
Pinkus et al.

(10) Patent No.: US 9,773,183 B2
(45) Date of Patent: Sep. 26, 2017

(54) MORPHOLOGICAL AUTOMATIC LANDOLT C ORIENTATION DETECTION

(71) Applicant: The United States of America, as represented by the Secretary of the Air Force, Wright-Patterson AFB, OH (US)

(72) Inventors: Alan R Pinkus, Bellbrook, OH (US); David W Dommett, Beavercreek, OH (US); Harry Lee Task, Tucson, AZ (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 15/147,175

(22) Filed: May 5, 2016

(65) Prior Publication Data

US 2016/0330438 A1    Nov. 10, 2016

Related U.S. Application Data

(60) Provisional application No. 62/158,016, filed on May 7, 2015.

(51) Int. Cl.
*H04N 17/00* (2006.01)
*H04N 17/02* (2006.01)
(Continued)

(52) U.S. Cl.
CPC ........... *G06K 9/3208* (2013.01); *G06K 9/209* (2013.01); *G06K 9/2081* (2013.01);
(Continued)

(58) Field of Classification Search
CPC ...... H04N 5/349; H04N 5/347; H04N 5/3458; H04N 5/57; H04N 1/0306; H04N 3/1506;
(Continued)

(56) References Cited

U.S. PATENT DOCUMENTS

| | | |
|---|---|---|
| 4,607,923 A | 8/1986 | Task et al. |
| 4,615,594 A | 10/1986 | Task |

(Continued)

OTHER PUBLICATIONS

Pinkus, A. R., et al., "Quad-Emissive Display for Multi-spectral Sensor Analyses.", Proceedings of SPIE, Orlando, FL, vol. 7336-50 (2009).

(Continued)

*Primary Examiner* — Jefferey F Harold
*Assistant Examiner* — Mustafizur Rahman
(74) *Attorney, Agent, or Firm* — AFMCLO/JAZ; Charles Figer, Jr.

(57) ABSTRACT

A method and apparatus are provided for automatically assessing a resolution of an optical sensor. An image is obtained from the sensor. The obtained image is thresholded to generate a binary image of black and white pixels using a first threshold value. A target area is selected from the binary image. The first threshold value is increased to generate a second threshold value. The target is thresholded using the second threshold value. At least one pixel is tagged at a center of the target area. Pixels surrounding a tagged pixel are processed, tagging white pixels. If a tagged pixel is at an edge of the target area, an orientation of an object in the target area is determined based on that edge. And, if no pixel is tagged at the edge of the target area, the second threshold value is decreased and the thresholding, tagging, and processing steps are repeated.

20 Claims, 23 Drawing Sheets

(51) Int. Cl.
    G06K 9/32      (2006.01)
    G06K 9/20      (2006.01)
    G06K 9/38      (2006.01)
    G06K 9/46      (2006.01)
    G06K 9/40      (2006.01)
    G06K 9/52      (2006.01)
    G06K 9/62      (2006.01)
    G06T 7/60      (2017.01)
    G06K 9/34      (2006.01)
(52) U.S. Cl.
    CPC ........... G06K 9/3241 (2013.01); G06K 9/342
        (2013.01); G06K 9/38 (2013.01); G06K 9/40
        (2013.01); G06K 9/4604 (2013.01); G06K
        9/4652 (2013.01); G06K 9/52 (2013.01);
        G06K 9/6201 (2013.01); G06T 7/60 (2013.01);
        H04N 17/002 (2013.01); G06K 2009/4666
        (2013.01); G06T 2207/20021 (2013.01)
(58) Field of Classification Search
    CPC ............. H04N 13/0257; H04N 17/002; H04N
        17/004; H04N 2005/44517; G06K
        9/2081; G06K 9/209; G06K 9/38; G06K
        9/4652; G06K 9/4604; G06K 9/6201;
        G06K 9/52
    USPC ............ 348/188, 180, 181, 187, 140, 230.1,
        348/231.6, 236, 237, 238, 246, 266, 271,
        348/272, 277, 278, 279, 294, 298, 336,
        348/340, 341, 425.1, 557, 563, 564, 569,
        348/571, 658, 717, 719, 743, 756, 779,
        348/781, 813, 815, 77, 54, 49, 43, 25
    See application file for complete search history.

(56)            References Cited

U.S. PATENT DOCUMENTS

| | | | |
|---|---|---|---|
| 4,618,231 A | 10/1986 | Genco et al. | |
| 5,880,814 A | 3/1999 | McKnight et al. | |
| 7,537,343 B2 | 5/2009 | Kanazawa et al. | |
| 7,771,051 B2 | 8/2010 | Hirji | |
| 7,819,524 B2 | 10/2010 | Kanazawa et al. | |
| 8,083,353 B2 | 12/2011 | Hytowitz | |
| 8,184,923 B2 | 5/2012 | Hayakawa et al. | |
| 8,197,065 B2 | 6/2012 | Yoo et al. | |
| 8,324,564 B1 | 12/2012 | Pinkus et al. | |
| 8,483,486 B1 | 7/2013 | Pinkus et al. | |
| 8,620,069 B1 | 12/2013 | Pinkus et al. | |
| 9,186,909 B1* | 11/2015 | Paliy | H04N 5/3572 |
| 9,538,100 B1* | 1/2017 | Ramanath | H04N 17/002 |
| 2003/0099406 A1* | 5/2003 | Georgiev | G06K 9/40 |
| | | | 382/268 |
| 2004/0151375 A1* | 8/2004 | Kim | G06K 9/00885 |
| | | | 382/181 |
| 2006/0184021 A1* | 8/2006 | Kim | G06K 9/40 |
| | | | 600/437 |
| 2007/0002080 A1* | 1/2007 | Ishizaka | G06K 15/02 |
| | | | 345/660 |
| 2007/0025625 A1* | 2/2007 | Burian | G06K 9/38 |
| | | | 382/237 |
| 2007/0285537 A1 | 12/2007 | Dwinell et al. | |
| 2008/0088702 A1* | 4/2008 | Linsenmaier | G03B 17/18 |
| | | | 348/119 |
| 2009/0080709 A1* | 3/2009 | Rowe | G06K 9/00013 |
| | | | 382/115 |
| 2009/0207312 A1* | 8/2009 | Miyoshi | H04N 5/57 |
| | | | 348/687 |
| 2009/0285488 A1* | 11/2009 | Li | G06K 9/00261 |
| | | | 382/190 |
| 2010/0166321 A1* | 7/2010 | Sawant | G06K 9/522 |
| | | | 382/209 |
| 2011/0013033 A1* | 1/2011 | Mori | H04N 5/23212 |
| | | | 348/220.1 |
| 2012/0033240 A1* | 2/2012 | Kim | H04N 1/58 |
| | | | 358/1.9 |
| 2013/0162871 A1* | 6/2013 | Bosco | H04N 5/2176 |
| | | | 348/246 |
| 2013/0342671 A1* | 12/2013 | Hummel | G06K 9/6202 |
| | | | 348/77 |
| 2014/0002673 A1 | 1/2014 | Wu et al. | |
| 2015/0161818 A1* | 6/2015 | Komenczi | G06T 17/00 |
| | | | 348/43 |
| 2015/0187074 A1* | 7/2015 | Dommett | G06T 7/0018 |
| | | | 348/187 |
| 2015/0324946 A1* | 11/2015 | Arce | G06T 1/0021 |
| | | | 382/251 |
| 2016/0205282 A1* | 7/2016 | Metcalfe | H04N 1/047 |
| | | | 358/448 |

OTHER PUBLICATIONS

Task, H. L., et al., "Theoretical and Applied aspects of night vision goggle resolution and visual acuity assessment.", Helmet- and Helmet-Mounted Displays: Technologies & Applications, Proceedings of SPIE, Orlando, FL, vol. 6557, 65570P-1-11 (2007).

Pinkus, A. R., et al., "Reproducibility Limits of Night Vision Goggle Visual Acuity Measurements", SAFE Journal, 30(1) (2000).

Pinkus, A. R., et al., "Measuring observers' visual acuity through night vision goggles.", SAFE Symposium Proceeding 1998, 36th Annual Symposium, pp. 1-11 (1998).

Bijl, P., et al., "A critical evalutaion of test patterns for EO system characterization.", SPIE Proceedings vol. 4372, pp. 27-38 (2001).

Hogervorst, M. A., et al., "Capturing the sampling effects: a TOD sensor performance model.", SPIE Proceedings vol. 4372, pp. 62-73 (2001).

McHugh, S. W., et al., "TOD test method for characterizing electro-optical system performance.", SPIE Proceedings vol. 4372, pp. 39-45 (2001).

Bailey, I., et al., "New design principles for visual acuity letter charts.", American Journal of Optometry and Physiological Optics, 53, pp. 740-745 (1976).

Brown, R., et al., "New directions in psychology I", pp. 89-155, New York, Rinehart and Winston (1962).

Farrell, R., et al., "Design handbook for imagery interpretation equipment.", pp. 3.1-9-3.1-18, 4.3-60-4.3-61, 8.0-17-8.0-18, Seattle, Boeing Aerospace Company (1984).

Bifl, P., et al., "Guidelines for Accurate TOD Measurement.", SPIE Proceedings, vol. 3701, pp. 14-25 (1999).

Military Specification MIL-L-85762A, "Night vision imaging system (NVIS) compatible interior aircraft lighting." (Jan. 24, 1986).

Miller, R., et al., "Comparative visual performance with ANVIS and AN/PVS-5A night vision goggles under starlight conditions.", Technical Report No. USAFSAM-TR-84-28, USAF School of Aerospace Medicine, Brooks AFB, TX (1984).

National Academy of Sciences, "Recommended standard procedures for the clinical measurement and specification of visual acuity.", Report of Working Group 39, Committee on Vision, Advances in Ophthalmology, 41, pp. 103-148 (1980).

Pinkus, A. R., et al., "The effects of aircraft transparencies on night vision goggle-mediated visual acuity.", SAFE Symposium Proceedings 1997, 35th Annual Symposium Sep. 8-10, pp. 93-104 (1997).

Simpson, W. A., "The Step method: A new adaptive psychophysical procedure.", Perception & Psychophysics, 45(6), pp. 572-576 (1989).

Stefanik, R., "Image intensifier system resolution based on laboratory measured parameters", Technical Report No. 0112, Night Vision and Electronic Sensors Directorate, Ft. Belvoir, VA (Aug. 1994).

Task, H. L., "An evaluation and comparison of several measures of image quality for television displays.", Technical Report No. AMRL-TR-79-7, NTIS, Alexandria, VA (1979).

Wiley, R., "Visual acuity and stereopsis with night vision goggles.", Technical Report No. USAARL 89-9, U.S. Army Aeromedical Research Laboratory, Ft. Rucker, AL (1989).

(56) References Cited

OTHER PUBLICATIONS

Bijl, P., "TOD Predicts Target Acquisition Performance for Staring and Scanning Thermal Images.", SPIE Proceedings, vol. 4030, pp. 96-103 (2000).

Pinkus, A.R., et al., A comparison of Landolt C and triangle resolution targets using the synthetic observer approach to sensor resolution assessment. Proc SPIE, vol. 8392-45 (2012).

Pinkus, A.R., et al., "A Comparison of synthetic and human observer approaches to multispectral sensor resolution assessment," Proc. SPIE 8042,80420V (2011).

Pinkus, A.R., et al., "Synthetic observer approach to multispectral sensor resolution assessment," Proc. SPIE 7689, 76890E (2010).

Pinkus, A.R., et al., "A Continuous Motion Object Recognition Methodology for the Assessment of Multi-spectral Fusion Algorithms," Proc. SPIE 7336-35 (2009).

Neriani, K.E., et al., An investigation of image fusing algorithms using a visual performance-based image evaluation methodology. Proceedingsof SPIE, Orlando, FL, vol. 6968-44 (2008).

Pinkus, A.R., et al., Dynamic stimulus enhancement with Gabor-based filtered images. Proceedings of SPIE, Orlando, FL, vol. 6989-63 (2008).

Pinkus et al., "Reproducibility of Night Goggle Visual Acuity Measurements Using Landolt C's," SAFE Journal 30 (1), pp. 1-6 (2000).

* cited by examiner

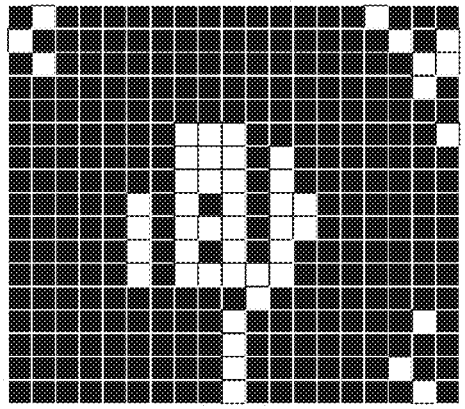
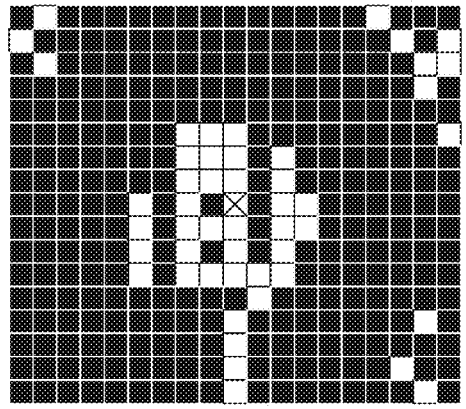
FIG. 13A
FIG. 13B
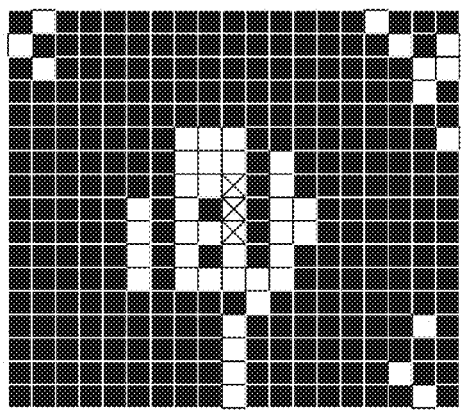
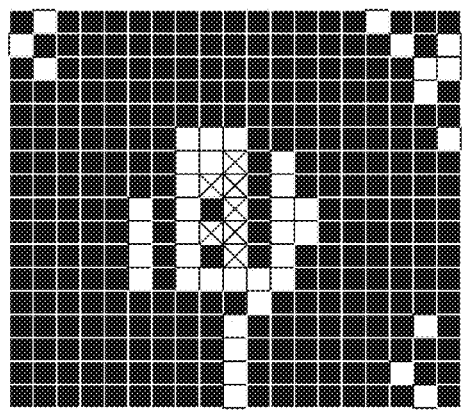
FIG. 13C
FIG. 13D

MORPHOLOGICAL AUTOMATIC LANDOLT C ORIENTATION DETECTION

CROSS-REFERENCE TO RELATED APPLICATIONS

This application claims the benefit of and priority to U.S. Provisional Application Ser. No. 62/158,016, entitled "Morphological Automatic Triangle and Landolt C Orientation Algorithms," filed on May 7, 2015, the entirety of which is incorporated by reference herein.

This application is related to U.S. patent application Ser. No. 15/147,122, filed on even date herewith by Pinkus et al., and entitled "Morphological Automatic Triangle Orientation Detection" (AFD 1405), the entirety of which is incorporated by reference herein.

RIGHTS OF THE GOVERNMENT

The invention described herein may be manufactured and used by or for the Government of the United States for all governmental purposes without the payment of any royalty.

BACKGROUND OF THE INVENTION

Field of the Invention

The present invention relates to pattern and object recognition, and more particularly to a method for detecting an object in a digital image.

Description of the Related Art

Over the years, there have been many methods developed to determine the image quality of an image-generating system such as a sensor/display combination. In most cases, the final consumer of the image produced is a human observer using their visual capability to extract visual information from the displayed image. In recent years, imaging systems and image manipulation have moved from the analog world to the digital world, which has probably added a bit more confusion to the issue of image quality or resolution.

In general, resolution is the ability of a sensor/display system to produce detail; the higher the resolution, the finer the detail that can be displayed. With the advent of digital imagery and sensor detectors that are composed of an array of discrete elements, it is tempting, and not entirely wrong, to characterize the resolution of the system by the number of picture elements (pixels) for the display or sensor elements in the case of the sensor. For example, VGA resolution for a computer display is 480 elements high by 640 elements wide and SVGA is 600×800 elements. This describes the number of samples that can be displayed; however, the number of pixels alone says nothing of the quality of the actual display medium characteristics (luminance, contrast capability, noise, color, refresh rate, active area to total area ratio, etc.) or of the signal/information used to feed the individual pixels. Nevertheless, this numerical value of pixel or sensor element count is often given as a primary metric to the resolution (quality) of the sensor or display.

Another common approach to determining the resolution of a sensor/display system is to image an appropriate resolution test target and determine the smallest sized critical test pattern element that can be seen by a human observer. Many test patterns have been developed over the years such as grating, tri-bars, tumbling Es, the Snellen chart, and the Landolt C chart to test vision or to test imaging systems using vision. The test pattern typically has test elements of various sizes so that the human observer can pick out the smallest size that they can resolve. An alternative to the multi-sized test pattern is to use a single size test element, but image it at various distances until a distance is obtained at which the test object is barely resolved.

Related to resolution is visual acuity, which is acuteness or clearness of vision that is dependent on the sharpness of the retinal focus within the eye and the sensitivity of the interpretative faculty of the brain. For example, numerous methods have been used to determine night vision goggle ("NVG") visual acuity such as limiting resolution, Snellen Acuity, square wave targets, Landolt Cs, adaptive psychophysical, and directly measuring the psychometric function or the "frequency of seeing" curve. Each method produces a number that is composed of an actual acuity value plus error. There can be many sources of error but the largest is generally the method itself as well as the inherent variability of the observer while working under threshold conditions. Observer variability may be reduced through extensive training, testing the same time every day, and shortened sessions in order to reduce eye fatigue. Additionally, even though observers are given specific instructions, response criteria may also vary among or within observers; even over the course of a single experimental session. To assist in eliminating the criteria problem, a four alternative forced-choice paradigm was developed and utilized to measure the entire psychometric function. This paradigm allowed for any desired response criteria level (e.g., 50% or 75% corrected for chance, probability of detection) to be selected for the prediction of (NVG) visual acuity performance. Although all of the preceding was directed at visual acuity/resolution assessment of night vision goggles using multiple human observers the "resolution" concept applies equally well to digital imagery.

Current and future military weapons systems (e.g. micro UAVs, satellites, surveillance, weapons aiming optics, day/night head-mounted devices) will increasingly rely on digitally-based multi-spectral imaging capabilities. With digital media comes the potential to register, fuse, and enhance digital images whether they are individual images or streaming video gathered in real-time. Multi-spectral fusion and enhancement provides the greatly increased potential to detect, track, and identify difficult targets, such as those that are camouflaged, buried, hidden behind a smoke screen or obscured by atmospheric effects (haze, rain, fog, snow).

There are several different conventional techniques to assess the relative improvement in image quality when an image-enhancing algorithm has been applied to a digital image. The testing of enhancing effects often consists of subjective quality assessments or measures of the ability of an automatic target detection program to find a target before and after an image has been enhanced. It is rare to find studies that focus on the human ability to detect a target in an enhanced image using scenarios that are relevant for the particular application for which the enhancement is intended. While a particular algorithm may make an image appear substantially better after enhancement, there is no indication as to whether this improvement is significant enough to improve human visual performance.

Therefore, there is a need in the art to automatically assess image quality in terms of modeled human visual resolution perceptual qualities (i.e., the "frequency of seeing" curve) but without the need to actually use human observers.

SUMMARY OF THE INVENTION

Embodiments of the invention are based on a morphological approach for determining orientation for Landolt C targets and provides a methodology for automatic assessment of digital quality and sensor resolution. The morphological approach is different, more computationally efficient, and more accurate than other contemporary methods. Overall, the automated assessments performed by the embodiments of the invention are in contrast to laborious and costly psychophysical procedures that execute extensive testing for multiple trained observers who are required to view and correctly judge the different orientations of many differently sized stimuli such as Landolt Cs (Landolt C Orientation; LCOR). Embodiments of the invention produce the same type of frequency of seeing functions as those produced by real observers and therefore the variations among different multispectral sensors and image registration, fusion, and enhancement algorithms may be accurately, and automatically assessed in real-time in terms of human visual perception, but without the need for human observers. Not only do embodiments of the invention quickly assess individual sensors (such as visible, near infrared, short-wave infrared, and thermal) but also imagery that that has been algorithmically combined (fused) information from multiple sensors (i.e., a synthetic sensor).

Embodiments of the invention provide a system, method, and program product for assessing an optical sensor. An image is obtained from the optical sensor. The obtained image is thresholded to generate a binary image of pixels having contrasting colors using a first threshold value. A target area is selected from the binary image. The first threshold value is increased to generate a second threshold value. The selected target area is then thresholded using the second threshold value. At least one pixel may be tagged at a center of the selected target area. Pixels surrounding a tagged pixel are processed, tagging those pixels that are a lighter color. In response to a tagged pixel being at an edge of the selected target area, an orientation of an object in the selected target area may then be determined based on the edge of the selected target area. If no pixels are tagged at the edge of the selected target area after processing, the second threshold value is reduced and the thresholding, tagging, and processing steps are repeated.

In some embodiments, the contrasting colors may be black and white. In some embodiments, the threshold values may be between 0 and 255. In one specific embodiment, the first threshold value may be incremented by about 60 to generate the second threshold value. In this specific embodiment, the orientation may not be determined if the second threshold value becomes less than the first threshold value minus 60.

In some embodiments, a size of the selected target area is determined. If the size of the target area, in these embodiments, is either 2 pixels by 3 pixels or 3 pixels by 2 pixels, the thresholded selected target area is compared to a set of known solutions to determine the orientation of the object in the selected target area. If, in these embodiments, pixels in the selected target area do not match any solutions in the set of known solutions, then the orientation is not determined.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIGS. 13A-13K illustrate an application of the embodiment of the invention of FIGS. 12A-12D with an adjusted threshold value.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Figure 1:
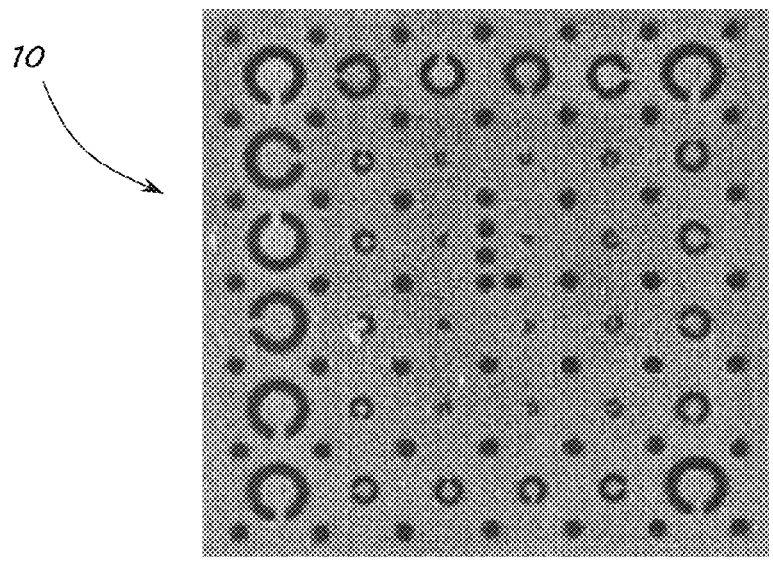
FIG. 1 is an exemplary image of a target used to assess sensor digital quality and resolution.

Embodiments of the invention employ a morphological automatic Landolt C orientation detection algorithm to determine orientations for Landolt C targets for assessment of sensor digital quality and sensor resolution. These embodiments may rely on receiving basic parameters in addition to images captured by the sensors. These basic parameters may include, among other things, a threshold value between 0 and 255 and a size (width and height) in pixels of a target area. In other embodiments, threshold values may be expressed in terms of a percentage or other value ranges. In still other embodiments, thresholds may then be calculated based on the minimum and maximum pixel values. In some embodiments, this threshold value may be the minimum pixel value plus one quarter of the difference between the maximum and minimum pixel values plus an additional offset which may be related to image size or other image properties. Each pixel of an image 10 of target, such as that in FIG. 1, may then be evaluated based on the threshold value in order to binarize the pixels of the image into pixels of contrasting colors, such as, for example, black and white. In some embodiments, if the pixel is greater than the threshold, then the pixel is set to white. Otherwise, the pixel is set to black. Some embodiments may additionally reevaluate the resulting binary image to assist in reducing noise.

Figure 2:
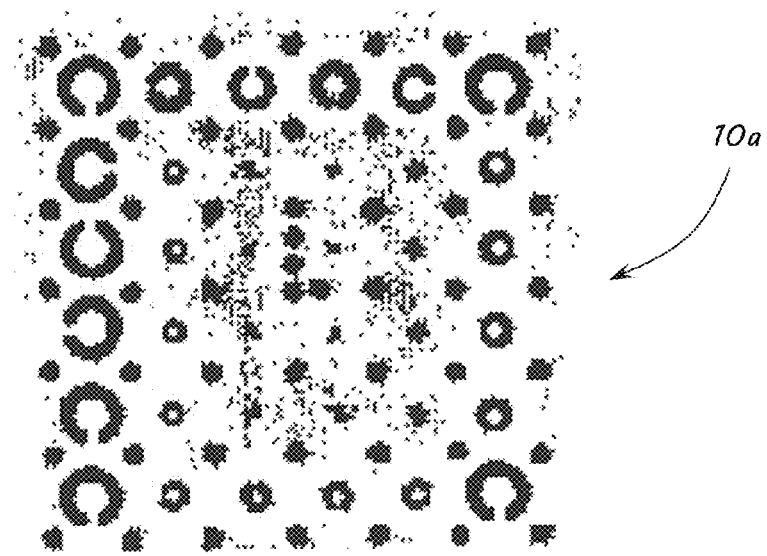
FIG. 2 is a representation of the image of FIG. 1 after a thresholding operation to create a binary image.

For example, in one embodiment, thresholding may be applied to the image 10 using a threshold value of about 90 percent. In one specific embodiment, this may include calculating a histogram for all of the pixels in the image and then choosing a threshold value such that 90 percent of all of the pixels in the image are white after thresholding. The resulting binary image 10a may be seen in FIG. 2. As can be seen in FIG. 2, the image 10a still contains random dark pixels, which are undesirable in the analysis described in further detail below. Thus, this thresholding may be further adjusted up or down until a satisfactory binarized image is achieved, such as image 10b in FIG. 3. From the binary image, such as image 10b, an area of the target may be selected, such as area 12, using automated methods, such as a method described in U.S. Ser. No. 14/164,330 by Dommett et al., filed on Jan. 27, 2014, and entitled "Omnibus Resolution Assessment Target for Sensors," which is incorporated by reference herein in its entirety.

Software algorithms consistent with embodiments of the invention may be utilized to automatically detect the orientation of the triangle targets in the images captured from the sensors identified above. These software algorithms may be implemented in an exemplary hardware and software environment for an apparatus 20, diagrammatically illustrated in FIG. 4. For the purposes of the invention, apparatus 20 may represent practically any type of computer, computer system or other programmable electronic device, including a client computer, a server computer, a portable computer, a hand-held computer, an embedded controller, etc. Moreover, apparatus 20 may be implemented using one or more networked computers, e.g., in a cluster or other distributed computing system. It should be appreciated that apparatus 20 may also include other suitable programmable electronic devices consistent with embodiments of the invention.

Apparatus 20 typically includes a central processing unit (CPU) 22 including one or more microprocessors coupled to a memory 24, which may represent random access memory (RAM) devices comprising the main storage of apparatus 20, as well as any supplemental levels of memory, e.g., cache memories, non-volatile or backup memories (e.g., programmable or flash memories), read-only memories, etc. In addition, memory 24 may be considered to include memory storage physically located elsewhere in apparatus 20, e.g., any cache memory in a processor in CPU 22, as well as any storage capacity used as a virtual memory, e.g., as stored on a mass storage device 26 or on another computer or controller coupled to apparatus 20.

Apparatus 20 also typically receives a number of inputs and outputs for communicating information externally. For interface with a user or operator, apparatus 20 typically includes a user interface 28 incorporating one or more user input devices 30 (e.g., a keyboard, a mouse, a trackball, a joystick, a touchpad, and/or a microphone, among others) and a display 32 (e.g., a CRT monitor, an LCD display panel, and/or a speaker, among others). Additionally, apparatus 20 may receive data directly from an imaging device 34. Otherwise, user input may be received via another computer, controller, or terminal, e.g., via a client or single-user computer (not shown) coupled to apparatus 20 over a network 36. This latter implementation may be desirable where apparatus 20 is implemented as a server or other form of multi-user computer. However, it should be appreciated that apparatus 20 may also be implemented as a standalone workstation, desktop, laptop, hand-held, smart-phone or other single-user computer in some embodiments.

For non-volatile storage, apparatus 20 typically includes one or more mass storage devices 26, e.g., a floppy or other removable disk drive, a hard disk drive, a direct access storage device (DASD), an optical drive (e.g., a CD drive, a DVD drive, etc.), flash memory data storage devices (USB flash drive), solid state drive, and/or a tape drive, among others. Furthermore, apparatus 20 may also include an interface 38 with one or more networks 36 (e.g., a LAN, a WAN, a wireless network, Bluetooth, and/or the Internet, among others) to permit the communication of information with other computers and electronic devices. It should be appreciated that apparatus 20 typically includes suitable analog and/or digital interfaces (e.g., BUS) between CPU 32 and each of components 24, 26, 28, and 38, as is well known in the art.

Apparatus 20 operates under the control of an operating system 40, and executes or otherwise relies upon various software applications, components, programs, objects, modules, data structures, etc. For example, an image detection/orientation algorithm 42 may be resident in memory 24 to analyze an image 44 acquired from the imaging device 34 and also in memory or alternately resident in mass storage 26. Moreover, various applications, components, programs, objects, modules, etc. may also execute on one or more processors in another computer coupled to apparatus 20 via the network 36, e.g., in a distributed or client-server computing environment, whereby the processing required to implement the functions of a computer program, such as the image detection/orientation algorithm 42, may be allocated to multiple computers over the network 36.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable signal bearing media used to actually carry out the distribution. Examples of computer readable media include but are not limited to non-transitory physical, recordable type media such as volatile and non-volatile memory devices, removable disks, hard disk drives, optical disks (e.g., CD-ROM's, DVD's, etc.), among others; and transmission type media such as digital and analog communication links.

Figure 4:
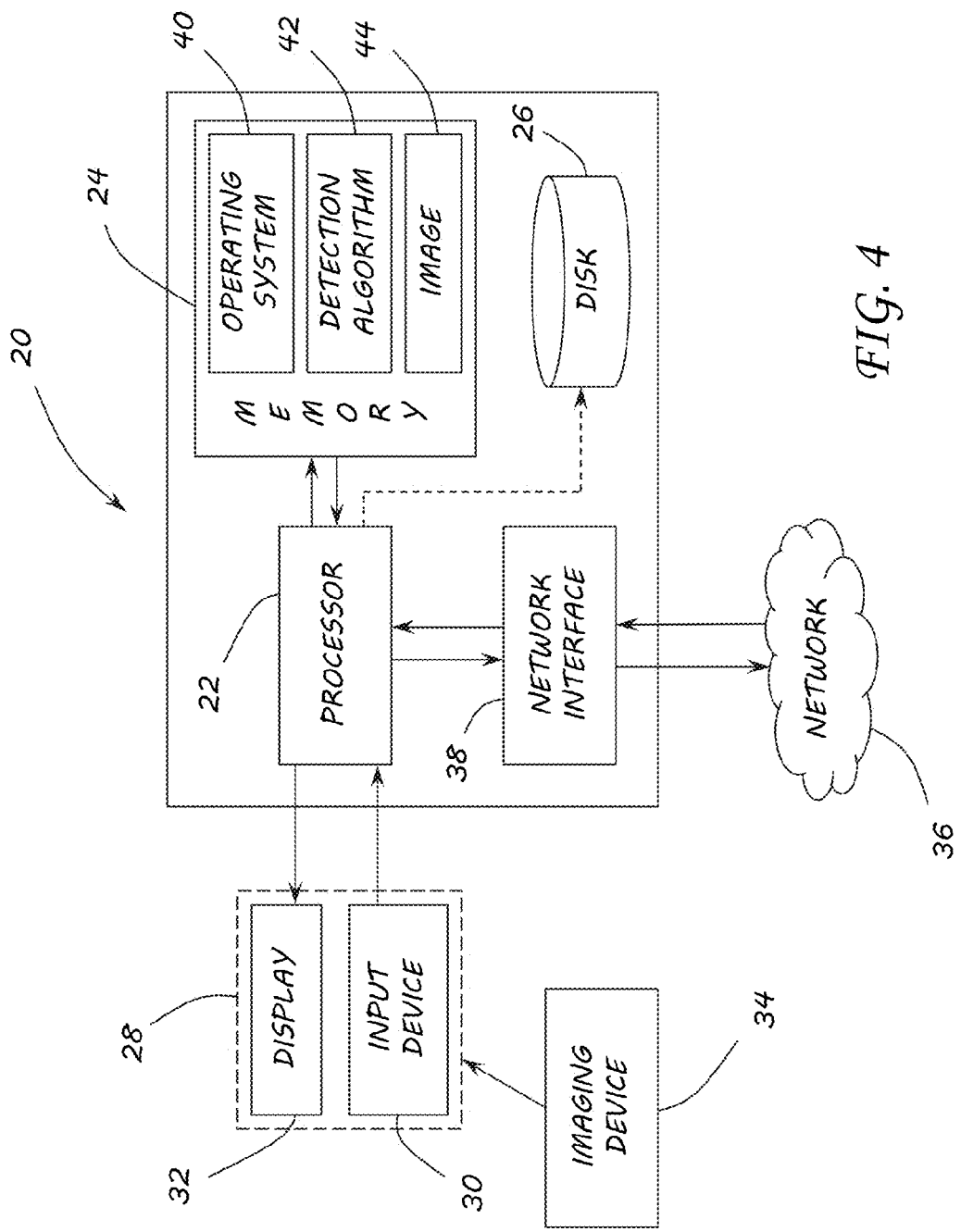
FIG. 4 is a schematic diagram of an exemplary hardware and software environment consistent with embodiments of the invention.
Figure 5A:
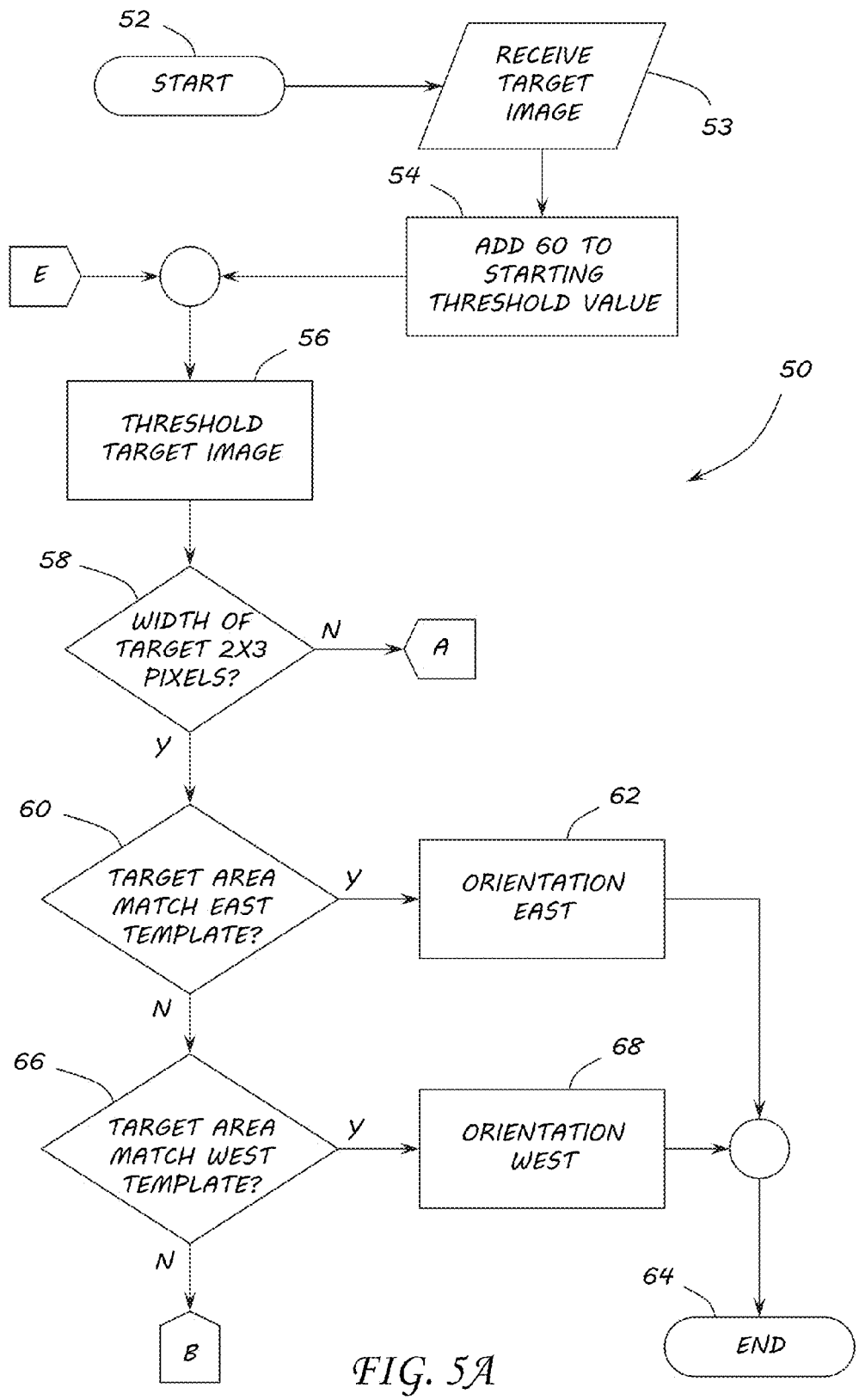
FIGS. 5A-5F contain a flow chart of an algorithm to perform detection and orientation of an object consistent with embodiments of the invention.
Figure 5B:
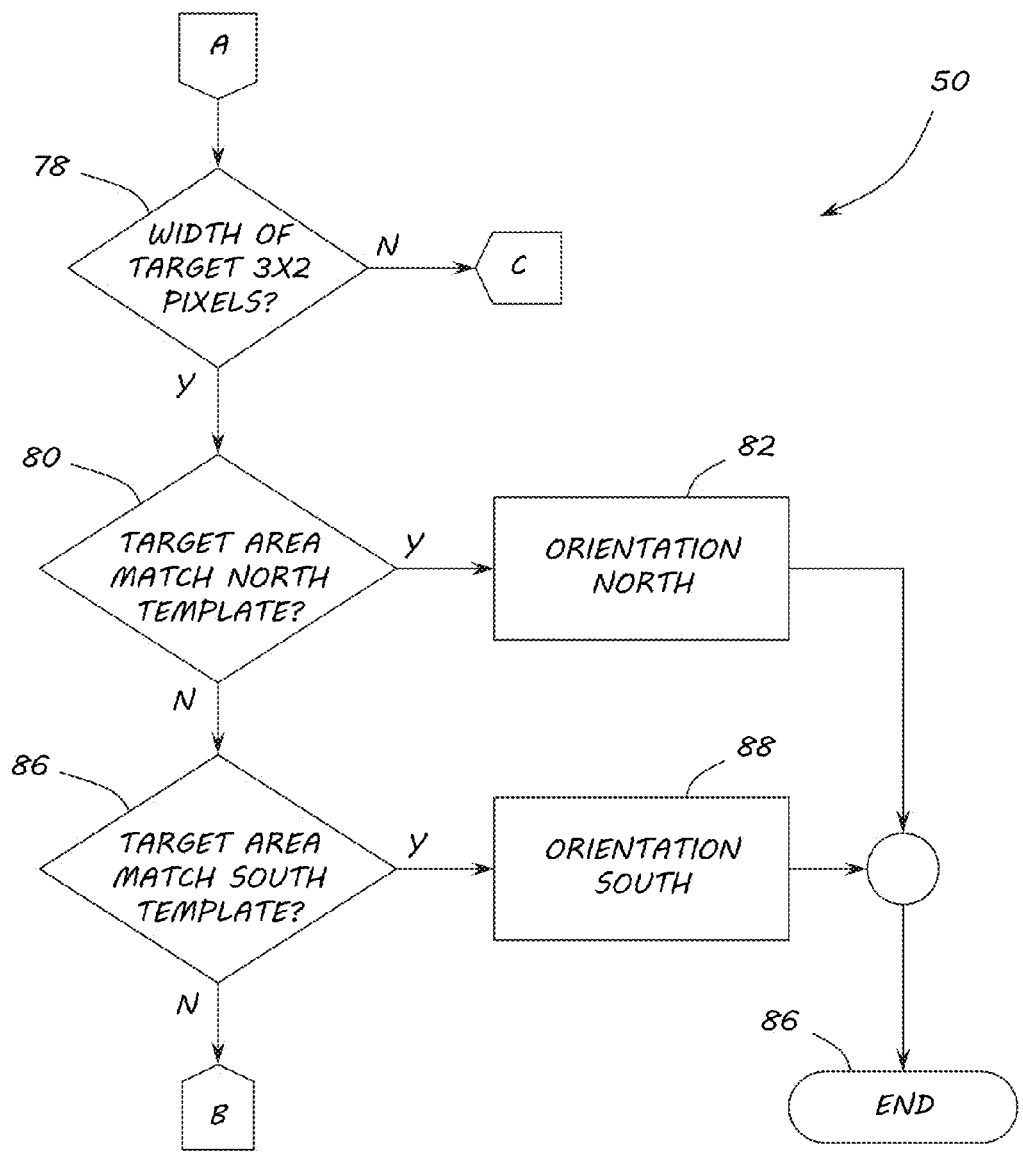
Figure 5C:
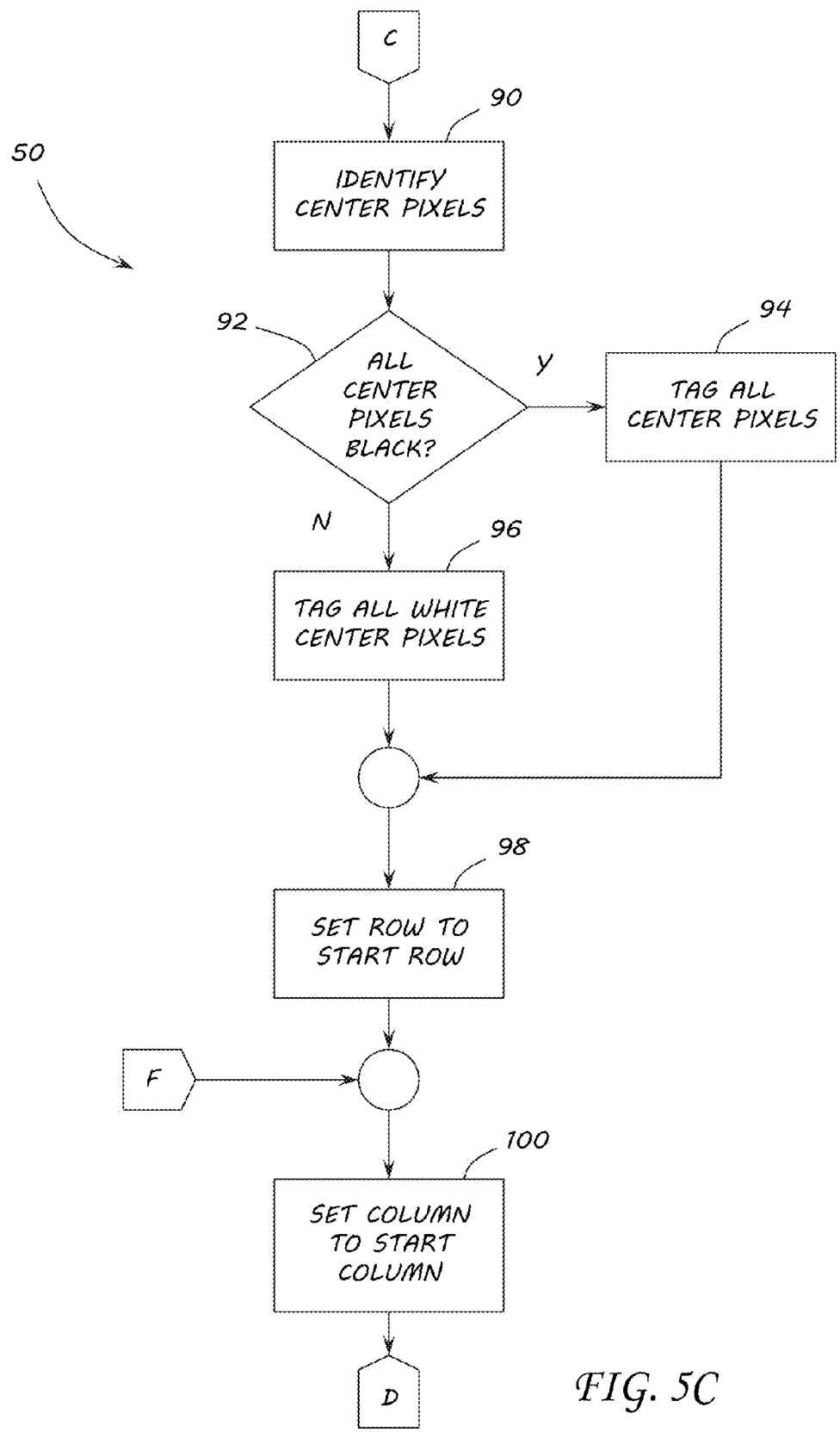
Figure 5D:
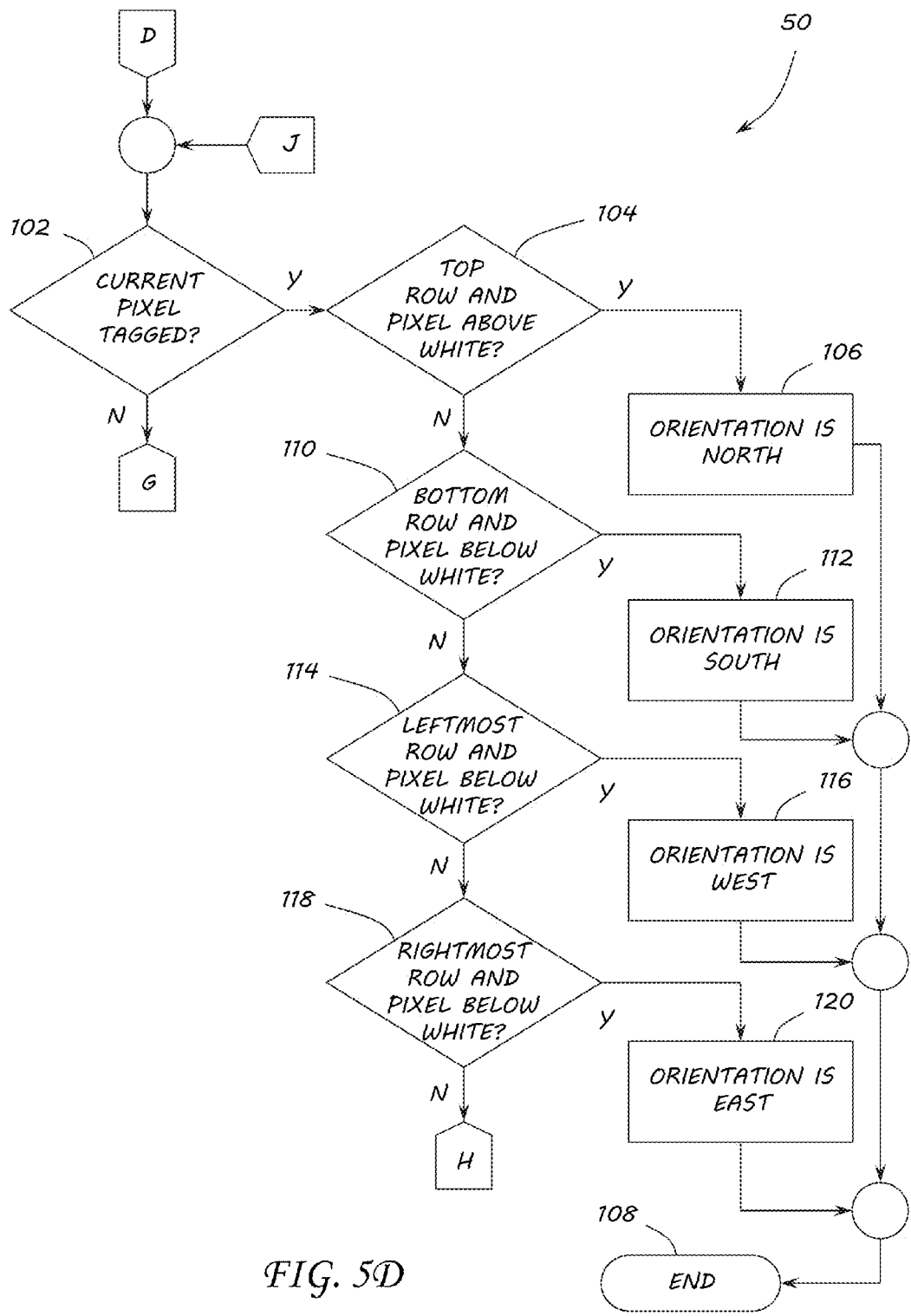
Figure 5E:
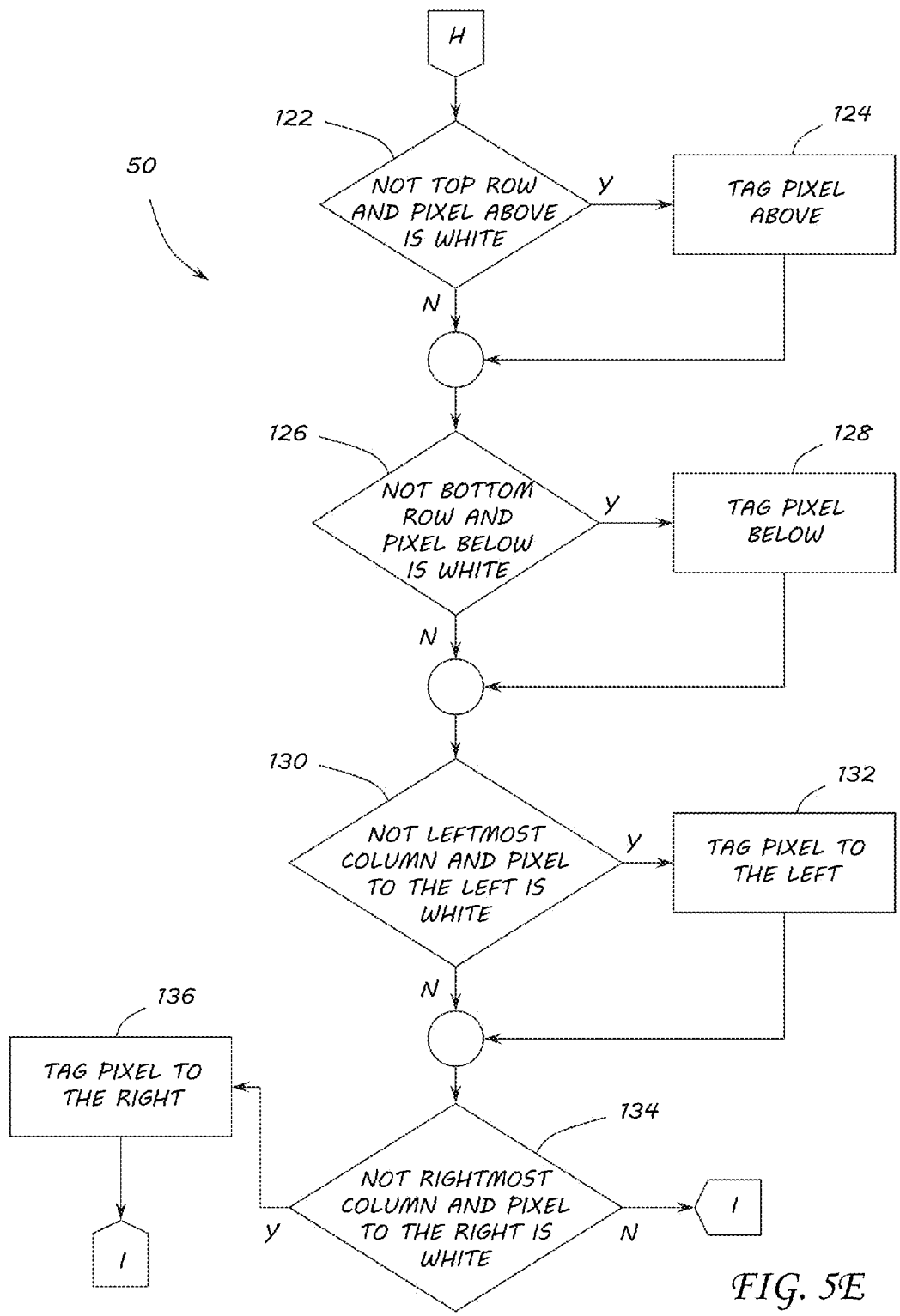
Figure 5F:
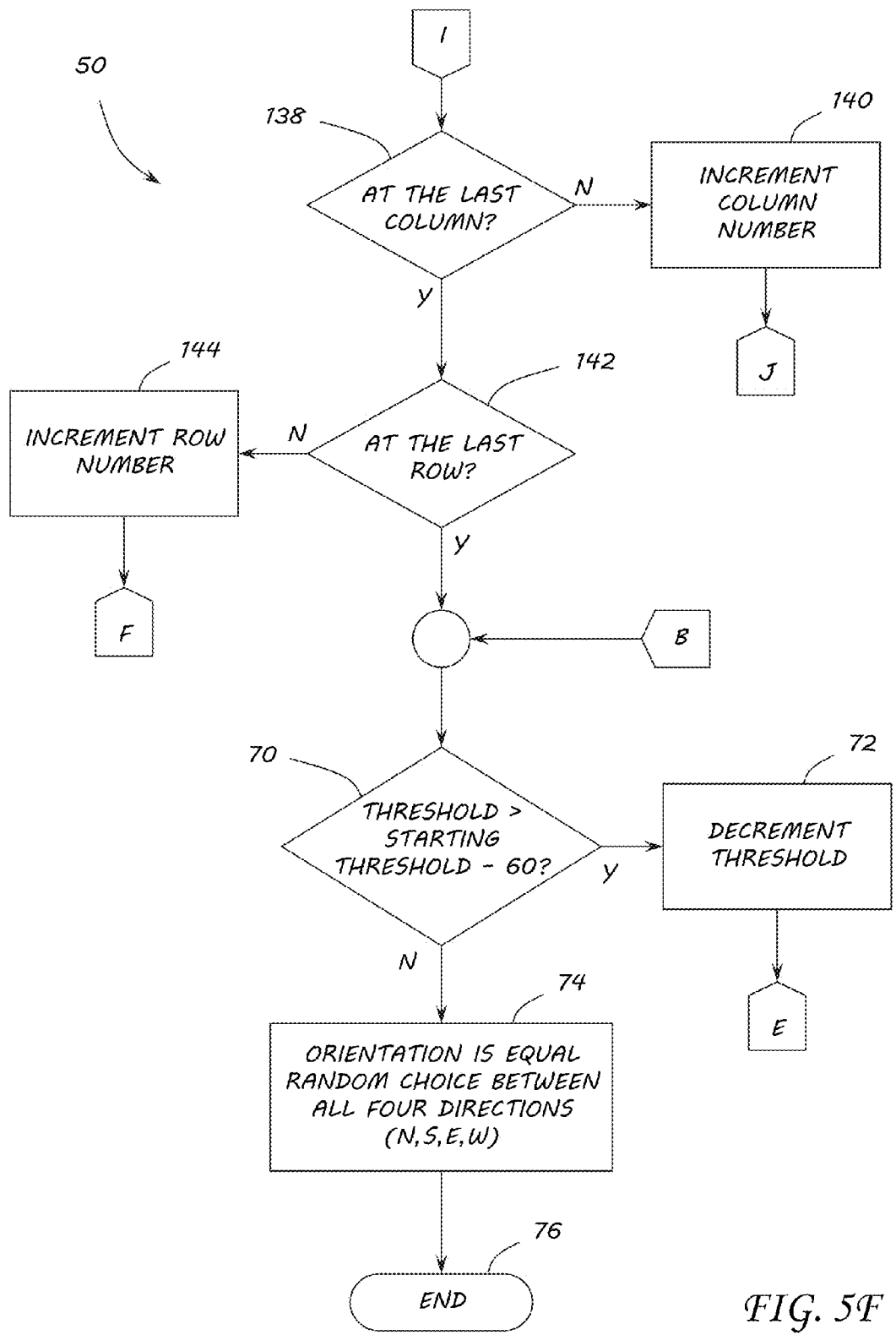
Figure 6A:
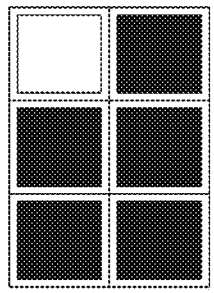
FIGS. 6A-6I contain known solutions to a special case for orientation detection for east facing objects.
Figure 6B:
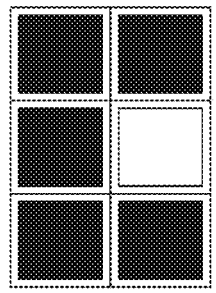
Figure 6C:
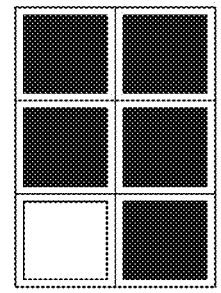
Figure 6D:
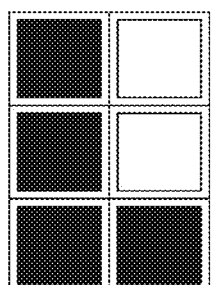
Figure 6E:
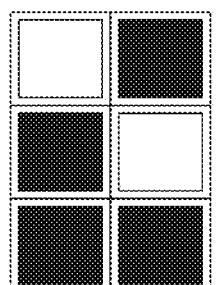
Figure 6F:
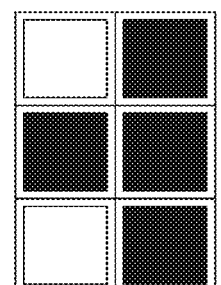
Figure 6G:
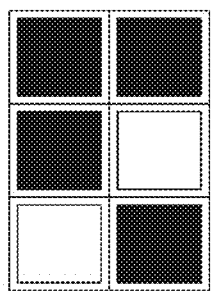
Figure 6H:
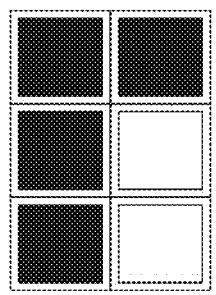
Figure 6I:
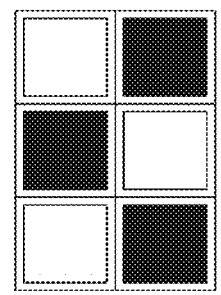
Figure 7A:
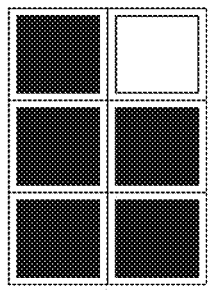
FIGS. 7A-7I contain known solutions to a special case for orientation detection for west facing objects.
Figure 7B:
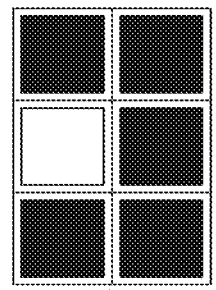
Figure 7C:
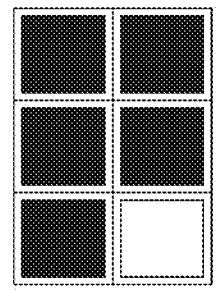
Figure 7D:
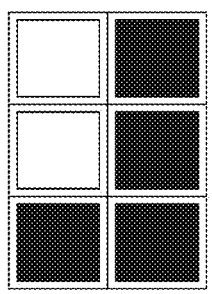
Figure 7E:
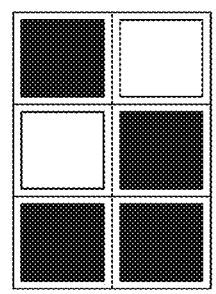
Figure 7F:
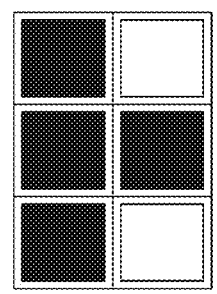
Figure 7G:
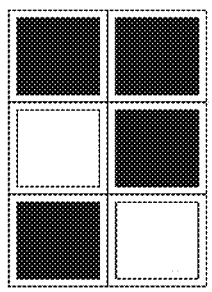
Figure 7H:
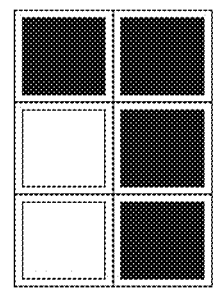
Figure 7I:
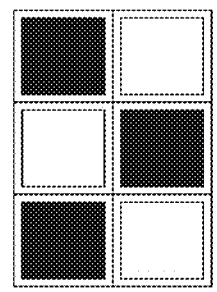
Figure 8A:
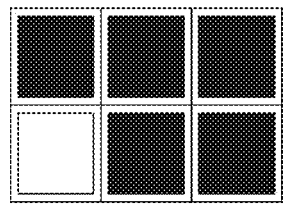
FIGS. 8A-8I contain known solutions to a special case for orientation detection for north facing objects.
Figure 8B:
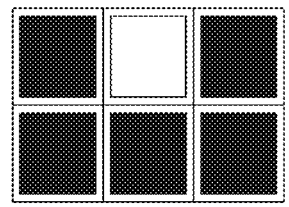
Figure 8C:
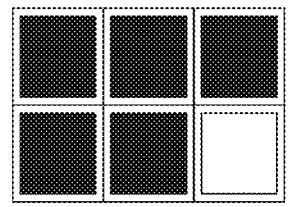
Figure 8D:
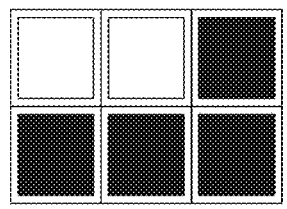
Figure 8E:
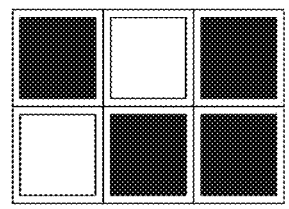
Figure 8F:
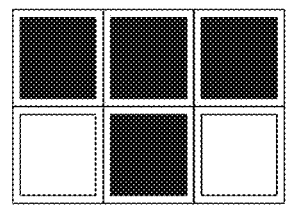
Figure 8G:
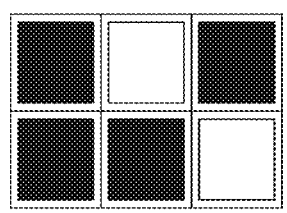
Figure 8H:
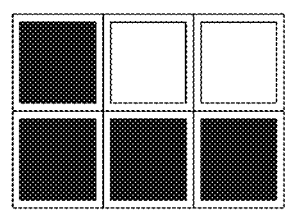
Figure 8I:
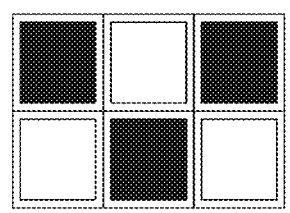
Figure 9A:
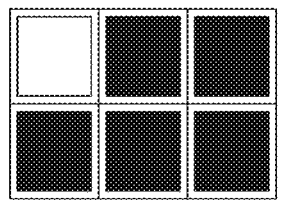
FIGS. 9A-9I contain known solutions to a special case for orientation detection for south facing objects.
Figure 9B:
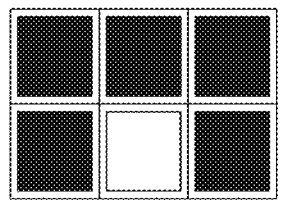
Figure 9C:
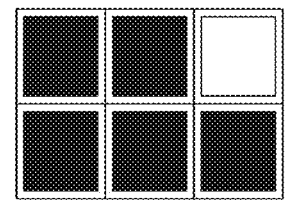
Figure 9D:
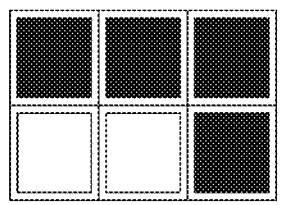
Figure 9E:
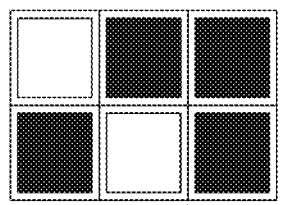
Figure 9F:
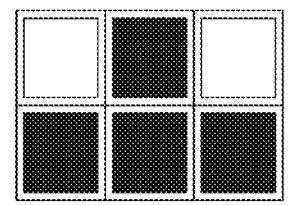
Figure 9G:
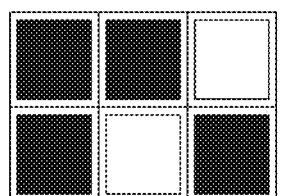
Figure 9H:
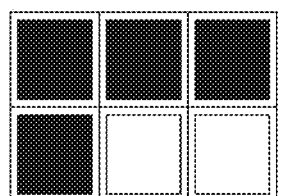
Figure 9I:
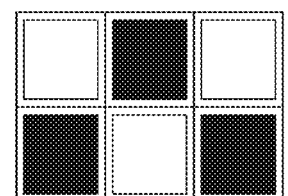

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein. Those skilled in the art will recognize that the exemplary environment illustrated in FIG. 4 is not intended to limit the present invention. Indeed, those skilled in the art will recognize that other alternative hardware and/or software environments may be used without departing from the scope of the invention.

Figure 3:
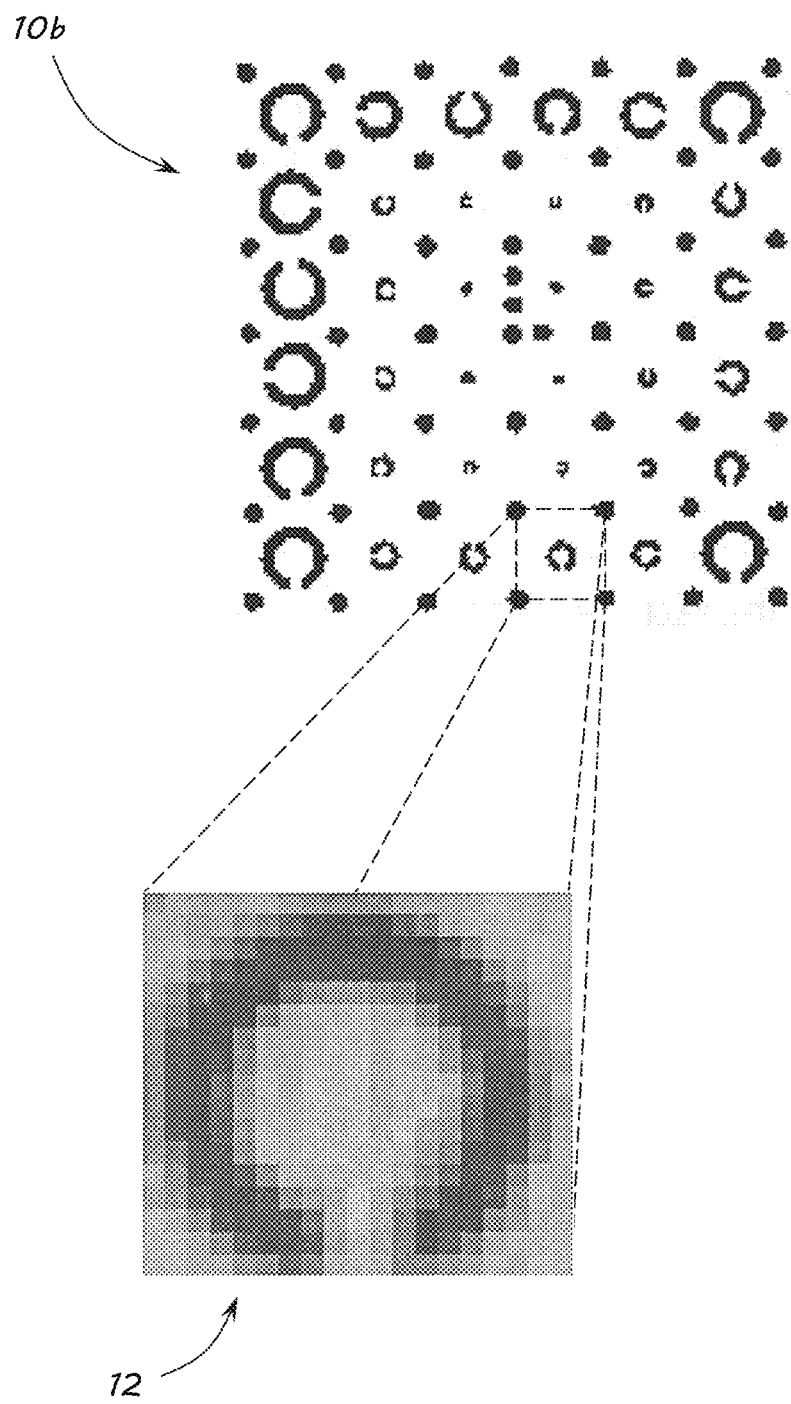
FIG. 3 is the binary image of FIG. 2, with additional removal of noise pixels.

FIGS. 5A-5F contain a flowchart 50 illustrating an exemplary algorithm, which may be utilized to implement embodiments for the invention. Prior to initiating the algorithm, a sensor obtains an image, which is initially thresholded, as set forth above. A target image 12, such as the image in FIG. 3, is selected for further orientation determination. Then, the algorithm begins at block 52. The target image 12 is received in block 53. In this illustrated embodiment, the threshold value used to threshold the image received from the sensor is increased by about 60 in block 54. Other embodiments may increase the threshold value by more or less, or in still other embodiments the threshold value may be decreased. The target image 12 is then thresholded in block 56 using the adjusted threshold value from block 54 and the methods as set forth above.

There two special cases with known arrangements that can be used to determine orientation. These cases are target images that consist of 2×3 or 3×2 pixels. If the target is two pixels wide by three pixels tall ("Yes" branch of decision block 58), then the target image 12 is compared against a set of known pixel arrangements illustrated in FIGS. 6A-6I. If the target image 12 matches any of these arrangements ("Yes" branch of decision block 60), then the orientation of the target image 12 is East in block 62, and the process ends at block 64. If the target image 12 does not match any of the arrangements ("No" branch of decision block 60), then the target image 12 is compared against a second set of known pixel arrangements illustrated in FIGS. 7A-7I. If the target image 12 matches any of these arrangements ("Yes" branch of decision block 66), then the orientation of the target image 12 is West in block 68 and the process ends at block 64. If the target image 12 does not match any of the arrangements ("No" branch of decision block 66), then the current threshold value is checked. If the current threshold value is greater than the starting threshold minus 60 ("Yes" branch of decision block 70), then the threshold is decremented in block 72 and the process repeats starting at block 56. If the threshold value is not greater than the starting threshold value minus 60 ("No" branch of decision block 70), the orientation could be an equal random choice of any of the four directions (N, S, E, W) in block 74 and the process ends at block 76.

If the target image is three pixels wide by two pixels tall ("Yes" branch of decision block 78), then the target image 12 is compared against a set of known pixel arrangements illustrated in FIGS. 8A-8I. If the target image 12 matches any of these arrangements ("Yes" branch of decision block 80), then the orientation of the target image 12 is North in block 82, and the process ends at block 84. If the target image 12 does not match any of the arrangements ("No" branch of decision block 80), then the target image 12 is compared against another set of known pixel arrangements illustrated in FIGS. 9A-9I. If the target image 12 matches any of these arrangements ("Yes" branch of decision block 86), then the orientation of the target image 12 is South in block 88 and the process ends at block 84. If the target image 12 does not match any of the arrangements ("No" branch of decision block 86), then the current threshold value is checked. If the current threshold value is greater than the starting threshold minus 60 ("Yes" branch of decision block 70), then the threshold is decremented in block 72 and the process repeats starting at block 56. If the threshold value is not greater than the starting threshold value minus 60 ("No" branch of decision block 70), the orientation could be an equal random choice of any of the four directions (N, S, E, W) in block 74 and the process ends at block 76.

Figure 10A:
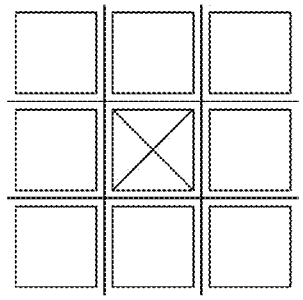
FIGS. 10A-10D illustrate a selection of center pixels from four possible configurations.
Figure 10B:
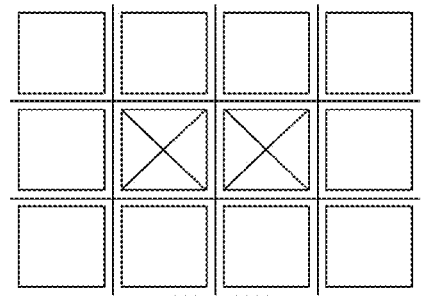
Figure 10C:
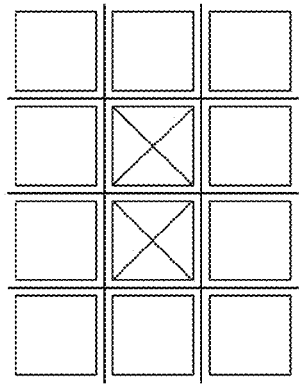
Figure 10D:
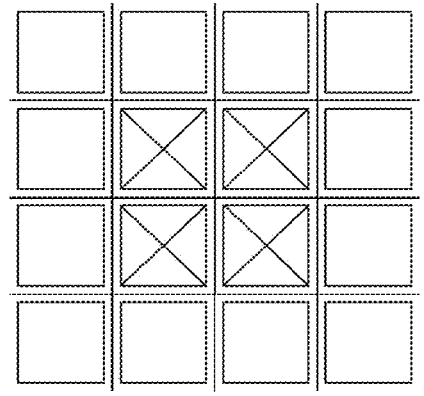

If the target image 12 does not fit within the special cases above ("No" branches of decision blocks 58 and 78), then center pixels in the target image 12 are identified in block 90. There are four possible arrangements of center pixels that may be tagged. Target areas with an odd number of rows and an odd number of columns of pixels will have one center pixel as illustrated in FIG. 10A. Target areas with an odd number of rows and an even number of columns of pixels will have two center pixels as illustrated in FIG. 10B. Target areas with an even number of rows and an odd number of columns of pixels will also have two center pixels as illustrated in FIG. 10C. And, if the target area has an even number of rows and an even number of columns of pixels, the center will consist of four pixels as illustrated in FIG. 10D. Once identified, a check is made to determine if all of the center pixels are black. If so ("Yes" branch of decision block 92), then all of the center pixels are tagged in block 94. Otherwise ("No" branch of decision block 92), only white pixels are tagged in block 96.

From a tagged pixel, set the pixel row to a starting row in block 98 and set the pixel column to a starting column in block 100. A check is made to determine if the current pixel is tagged. If the pixel is tagged ("Yes" branch of decision block 102), then a check is made to see of the row above is the top row and if the pixel above is a white pixel. If so ("Yes" branch of decision block 104), then an orientation of the target image 12 is determined to be north in block 106 and the process completes at block 108. Otherwise ("No" branch of decision block 104), a check is made to determine if a row below is the bottom row and if the pixel below is a white pixel. If so ("Yes" branch of decision block 110), then the orientation of the target image 14 is determined to be south in block 112 and the process completes at block 108. Otherwise ("No" branch of decision block 110), then a check is made to determine if a column to the left is the leftmost column and if the pixel to the left is white. If so ("Yes" branch of decision block 114), then the orientation of the target image 12 is determined to be to the west in block 116 and the process completes in block 108. If not ("No" branch of decision block 116), then a check is made to determine of a column to the right is the rightmost column and if the pixel to the right is white. If so ("Yes" branch of decision block 118), then the orientation of the target image 12 is determined to be to the east in block 120 and the process completes at block 108.

If none of the pixels are at the extremes of the target image 12, then if the row is not the top row and the pixel above is white ("Yes" branch of decision block 122), then the pixel above is tagged in block 124. If the row is not the bottom row and the pixel below is white ("Yes" branch of decision block 126), then the pixel below is tagged in block 128. If the column is not the leftmost column and the pixel to the left is white ("Yes" branch of decision block 130), then the pixel to the left is tagged in block 132. Finally, if the column is not the rightmost column and the pixel to the right is white ("Yes" branch of decision block 134), then the pixel to the right is tagged in block 136. If there are additional columns to process ("No" branch of decision block 138), then the column is incremented in block 140 and the process repeats at block 102. If there are no additional columns to process ("Yes" branch of decision block 138), then I there are additional rows to process ("No branch of decision block 142) the row number is incremented and the process repeats at block 100. If there are no additional rows to process ("No" branch of decision block 142), then and orientation has not been determined. A check is made to determine if the current threshold is greater than the starting threshold minus 60. If so ("Yes" branch of decision block 70), then the threshold is decremented at block 72 and the process is repeated at block 56. If the threshold is not greater, then an orientation of the target image 12 could be an equal random choice of any of the four directions (N, S, E, W) in block 74 and the process ends at block 76.

Figure 11A:
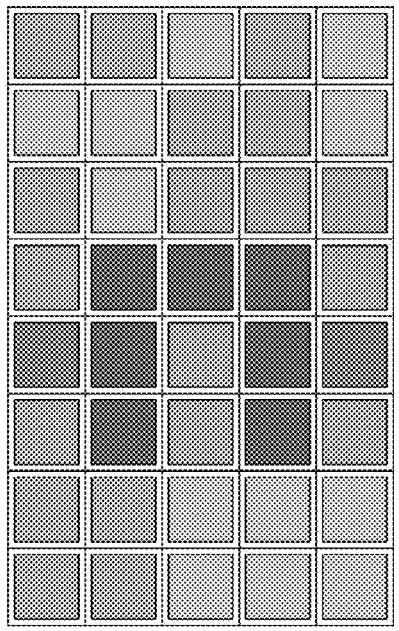
FIGS. 11A-E illustrate an application of an embodiment of the invention on a 5×8 pixel target image.
Figure 11B:
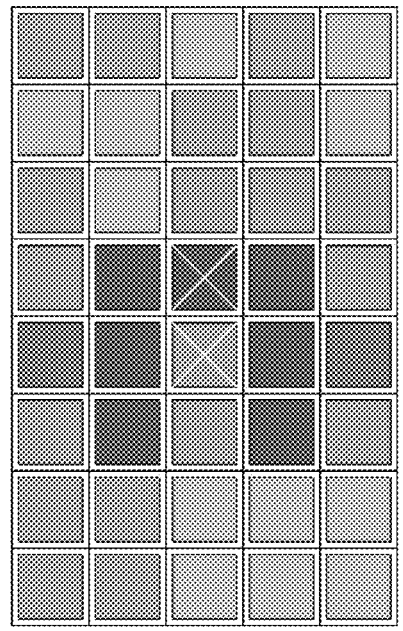
Figure 11C:
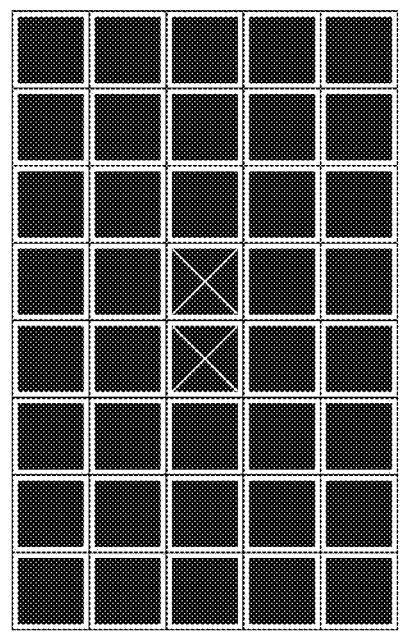
Figure 11D:
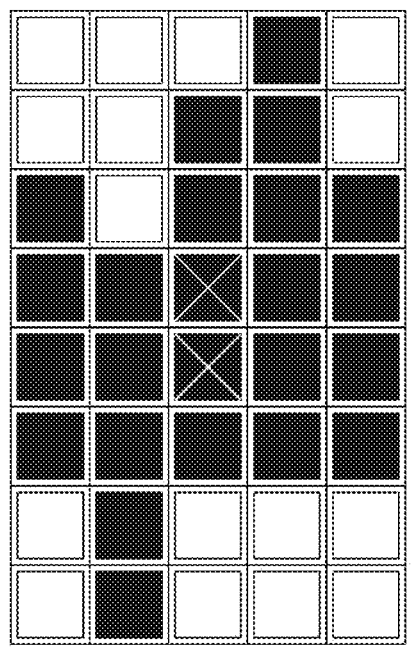
Figure 11E:
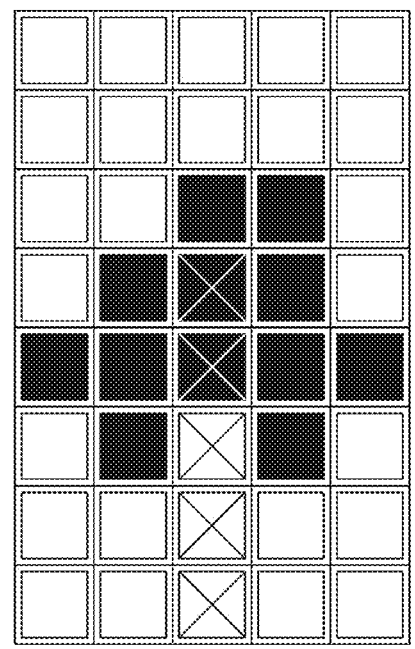

While the directions used for the above algorithm were chosen as north, south, east, and west, they could just as easily be substituted with upper, lower, right, and left, or top, bottom, right, and left, etc. Additionally, while the change in threshold value was chosen to be 60 for this embodiment, other embodiments may utilize other values, either greater or less than 60. A practical example of the above process is illustrated in FIGS. 11A-11E. In this example, the target image is an image that is 5 pixels wide by 8 pixels high. FIG. 11A represents the original target image. FIG. 11B illustrates the two center pixels tagged. FIGS. 11C-E illustrate how the target image appears at different levels of threshold as the threshold value is decreased from a higher value to a lower value. For example, at a threshold value of 159, FIG. 11C illustrates how the entire region appears black and the tagged center pixels cannot grow in any direction due to a complete lack of white pixels. At a threshold of 100, FIG. 11D illustrates that there are now white pixels in the target but still none of them are touching the tagged center pixels and therefore the tagged region cannot grow in any direction to reach the edge of the area. Finally, at a threshold value of 92, the "C" shape is slightly discernible and the center tagged pixels are able to "grow" to the South direction because a single white pixel touches the center tagged pixels. In this example, the orientation of the target image is South.

Figure 12A:
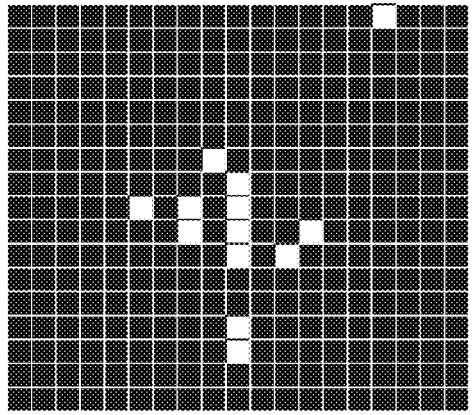
FIGS. 12A-12D illustrate an application of an embodiment of the invention on the target image identified in FIG. 3.
Figure 12B:
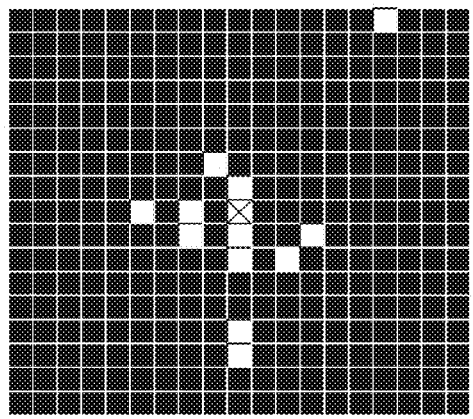
Figure 12C:
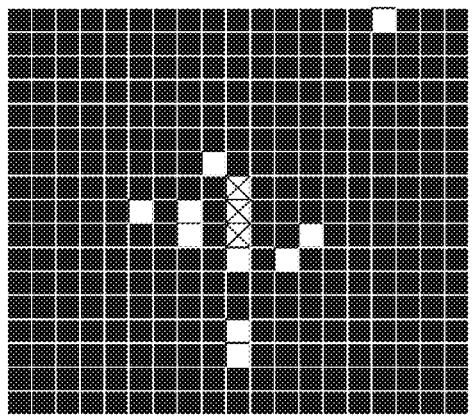
Figure 12D:
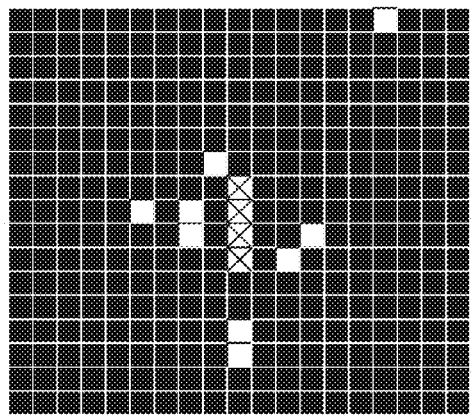
Figure 13E:
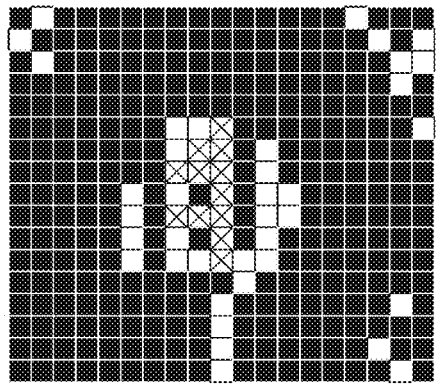
Figure 13F:
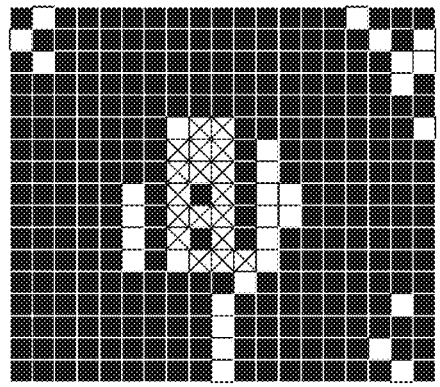
Figure 13G:
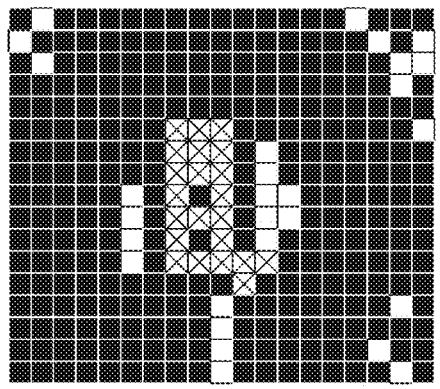
Figure 13H:
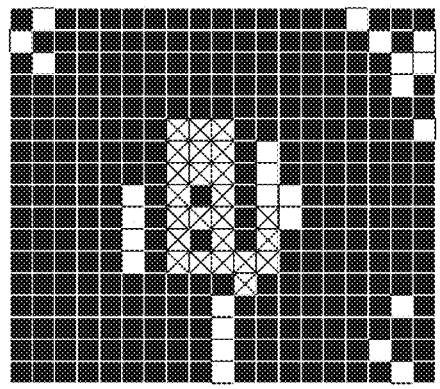
Figure 13I:
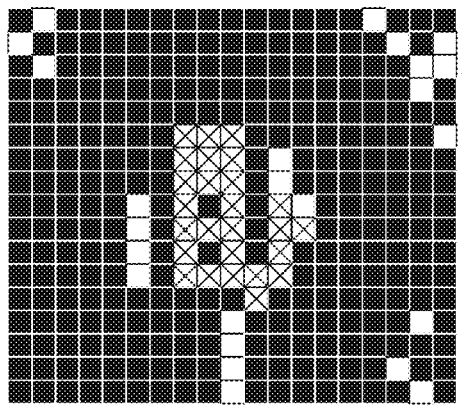
Figure 13J:
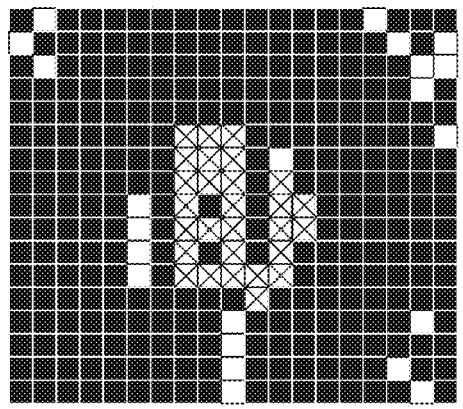
Figure 13K:
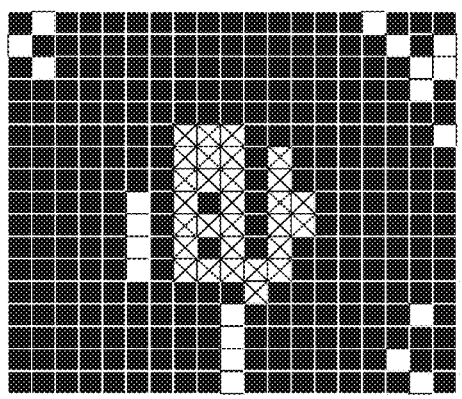
Figure 14A:
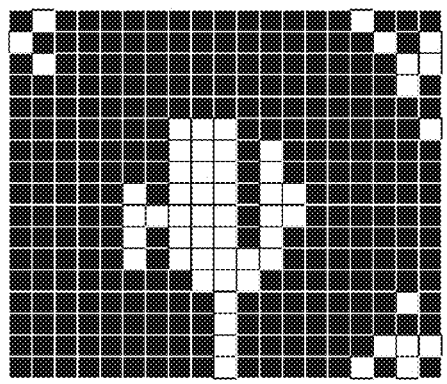
FIGS. 14A-14J illustrate an application of the embodiment of the invention of FIGS. 12A-12D and FIGS. 13A-13K with an adjusted threshold value.
Figure 14B:
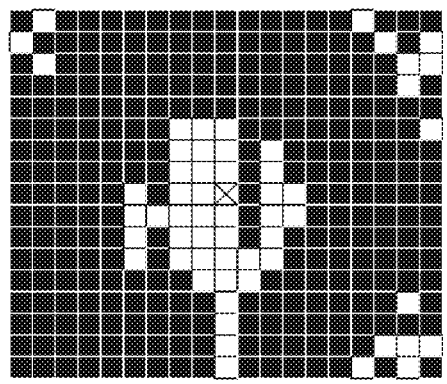
Figure 14C:
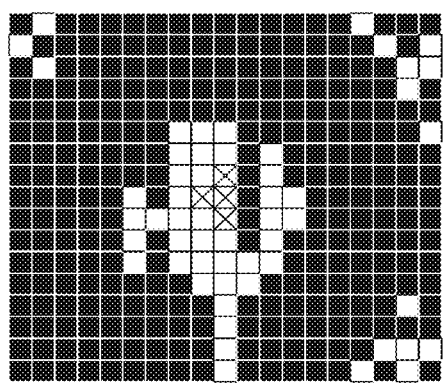
Figure 14D:
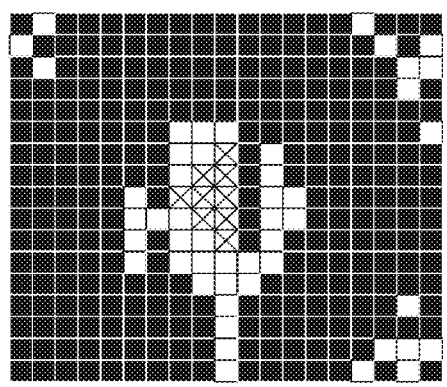
Figure 14E:
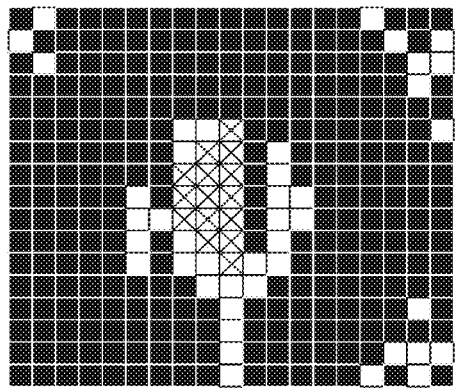
Figure 14F:
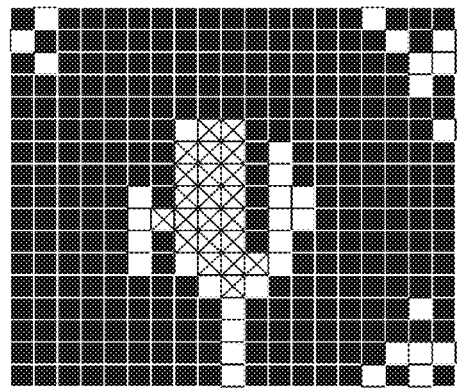
Figure 14G:
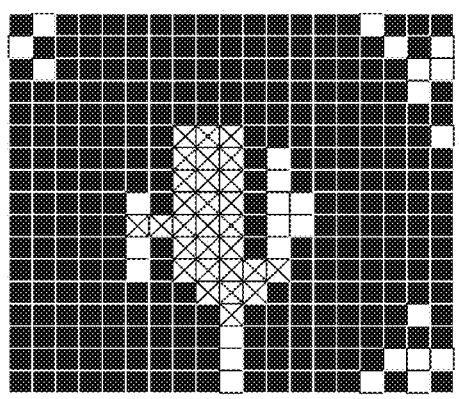
Figure 14H:
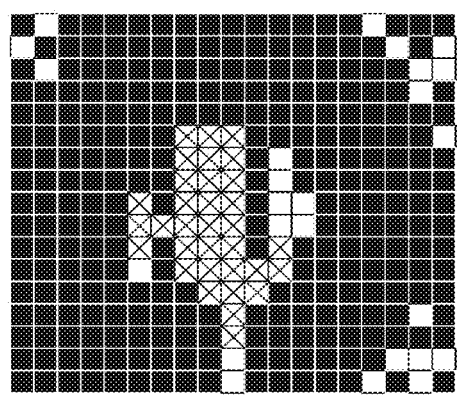
Figure 14I:
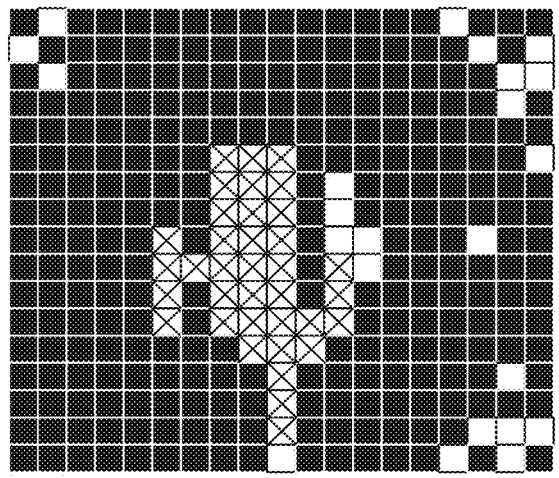
Figure 14J:
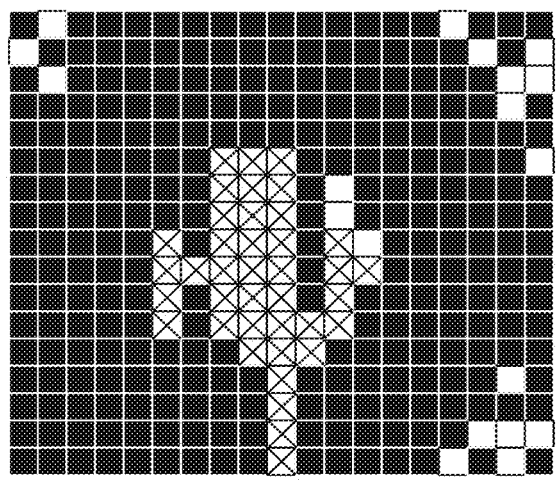

FIGS. 12A-D demonstrate the above algorithm working on the target image 12 from FIG. 3. FIG. 12A illustrates the original target image after thresholding at a threshold value of 140 (leaving relatively few connected white pixels). FIG. 12B illustrates a single center pixel that has been tagged. FIGS. 12C and 12D illustrate how the region of tagged pixels grows in a limited area before the cycle has halted. In order to find more connected white pixels, the threshold value needs to be decreased. FIGS. 13A-K demonstrate the algorithm above working on the target image 12 from FIG. 3 after thresholding at a threshold value of 129. FIG. 13B illustrates a single center pixel has been tagged. FIGS. 13C-K each show the progression of pixels being tagged, but like the previous attempt in FIGS. 12A-D, the growth of tagged pixels is unable to reach an edge of the target image 12. Finally, FIGS. 14A-J demonstrate the algorithm above working on the target image 12 from FIG. 3 after thresholding at a threshold value of 128. Again FIG. 14B illustrates a single center pixel being tagged. FIGS. 14C-I illustrate the growth of tagged pixels, with FIG. 14J illustrating a tagged pixel touching the bottom edge of the target image 12 resulting in an orientation of South.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A method of assessing a resolution of an optical sensor, the method comprising:
    obtaining an image from the optical sensor;
    thresholding the obtained image to generate a binary image of pixels having contrasting colors using a first threshold value;
    selecting a target area from the binary image;
    increasing the first threshold value to generate a second threshold value;
    thresholding the selected target area using the second threshold value;
    tagging at least one pixel at a center of the selected target area;
    processing pixels surrounding a tagged pixel, tagging those pixels that are a lighter color of the contrasting colors;
    in response to a tagged pixel being at an edge of the selected target area, determining an orientation of an object in the selected target area based on the edge of the selected target area; and
    in response to not tagging a pixel at the edge of the selected target area, decreasing the second threshold value and repeating the thresholding, tagging, and processing steps.

2. The method of claim 1, wherein the contrasting colors are black and white.

3. The method of claim 1, wherein the first threshold value is between 0 and 255.

4. The method of claim 3, wherein the first threshold value is incremented by 60 to generate the second threshold value.

5. The method of claim 3, wherein the orientation is not determined if the second threshold value becomes less than the first threshold value minus 60.

6. The method of claim 1, the method further comprising:
    determining a size of the selected target area;
    in response to the size of the target area being either 2 pixels by 3 pixels or 3 pixels by 2 pixels, comparing the thresholded selected target area to a set of known solutions to determine the orientation of the object in the selected target area.

7. The method of claim 6, wherein the orientation is not determined if pixels in the selected target area do not match any solutions in the set of known solutions.

8. A system comprising:
an optical sensor;
a memory;
a processor; and
program code resident in the memory and configured to assess a resolution of the optical sensor, the program code further configured, when executed by the processor, to obtain an image from the optical sensor, threshold the obtained image to generate a binary image of pixels of contrasting colors using a first threshold value, select a target area from the binary image, increase the first threshold value to generate a second threshold value, threshold the selected target area using the second threshold value, tag at least one pixel at a center of the selected target area, process pixels surrounding a tagged pixel, tagging those pixels that are a lighter color of the contrasting colors, in response to a tagged pixel being at an edge of the selected target area, determine an orientation of an object in the selected target area based on the edge of the selected target area, and in response to not tagging a pixel at the edge of the selected target area, decrease the second threshold value and repeat the thresholding, tagging, and processing steps.

9. The method of claim 8, wherein the program code is further configured for the contrasting colors to be black and white.

10. The system of claim 8, wherein the program code is further configured for the first threshold value to be between 0 and 255.

11. The system of claim 10, wherein the program code is further configured to increment the first threshold value by 60 to generate the second threshold value.

12. The system of claim 10, wherein the program code is further configured to not determine the orientation if the second threshold value becomes less than the first threshold value minus 60.

13. The system of claim 8, wherein the program code is further configured to:
determine a size of the selected target area;
in response to the size of the target area being either 2 pixels by 3 pixels or 3 pixels by 2 pixels, compare the thresholded selected target area to a set of known solutions to determine the orientation of the object in the selected target area.

14. The system of claim 13, wherein the program code is further configured to not determine the orientation if pixels in the selected target area do not match any solutions in the set of known solutions.

15. A program product comprising:
a non-transitory computer recordable type medium; and
program code resident on the computer recordable type medium and configured to assess a resolution of the optical sensor, the program code further configured, when executed on a hardware implemented processor, to obtain an image from the optical sensor, threshold the obtained image to generate a binary image of pixels contrasting colors using a first threshold value, select a target area from the binary image, increase the first threshold value to generate a second threshold value, threshold the selected target area using the second threshold value, tag at least one pixel at a center of the selected target area, process pixels surrounding a tagged pixel, tagging those pixels that are a lighter color of the contrasting colors, in response to a tagged pixel being at an edge of the selected target area, determine an orientation of an object in the selected target area based on the edge of the selected target area, and in response to not tagging a pixel at the edge of the selected target area, decrease the second threshold value and repeat the thresholding, tagging, and processing steps.

16. The program product of claim 15, wherein the program code is further configured for the first threshold value to be between 0 and 255.

17. The program product of claim 16, wherein the program code is further configured to increment the first threshold value by 60 to generate the second threshold value.

18. The program product of claim 16, wherein the program code is further configured to not determine the orientation if the second threshold value becomes less than the first threshold value minus 60.

19. The program product of claim 15, wherein the program code is further configured to:
determine a size of the selected target area;
in response to the size of the target area being either 2 pixels by 3 pixels or 3 pixels by 2 pixels, compare the thresholded selected target area to a set of known solutions to determine the orientation of the object in the selected target area.

20. The program product of claim 19, wherein the program code is further configured to not determine the orientation if pixels in the selected target area do not match any solutions in the set of known solutions.

* * * * *